United States Patent
Zinner et al.

(10) Patent No.: US 11,316,604 B2
(45) Date of Patent: Apr. 26, 2022

(54) TOPOLOGY DISCOVERY IN AN AUTOMOTIVE ETHERNET NETWORK

(71) Applicant: CONTINENTAL AUTOMOTIVE GMBH, Hannover (DE)

(72) Inventors: Helge Zinner, Munich (DE); Julian Brand, Munich (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/262,948

(22) PCT Filed: Jul. 24, 2019

(86) PCT No.: PCT/EP2019/069890
§ 371 (c)(1),
(2) Date: Jan. 25, 2021

(87) PCT Pub. No.: WO2020/020932
PCT Pub. Date: Jan. 30, 2020

(65) Prior Publication Data
US 2021/0167881 A1    Jun. 3, 2021

(30) Foreign Application Priority Data

Jul. 25, 2018 (DE) ...................... 10 2018 212 354.3

(51) Int. Cl.
*H04J 3/06* (2006.01)
*H04L 12/40* (2006.01)

(52) U.S. Cl.
CPC .......... *H04J 3/0641* (2013.01); *H04J 3/0667* (2013.01); *H04J 3/0679* (2013.01); *H04L 12/40006* (2013.01); *H04L 2012/40273* (2013.01)

(58) Field of Classification Search
CPC ...... H04J 3/0641; H04J 3/0667; H04J 3/0679; H04L 12/40006; H04L 2012/40273
See application file for complete search history.

(56) References Cited

U.S. PATENT DOCUMENTS 8,804,552 B2   8/2014   Olsson
8,867,400 B2   10/2014  Cheng et al.
(Continued)

FOREIGN PATENT DOCUMENTS

CN   101399757 A   4/2009
CN   101651992 A   2/2010
(Continued)

OTHER PUBLICATIONS

IEEE Standard 802.1 AS-2011: "Timing and Synchronization for Time-Sensitive Applications Bridged Local Area Networks", IEEE Std 802.AS™-2011, Mar. 30, 2011 (Mar. 30, 2011) URL: https://ieeexplore.ieee.org/stamp/stamp.jsp?tp=&arnumber=5741898 [retrieved on May 16, 2019].

(Continued)

*Primary Examiner* — Samina F Choudhry
(74) *Attorney, Agent, or Firm* — Laurence A. Greenberg; Werner H. Stemer; Ralph E. Locher

(57) ABSTRACT

A node may determine the topology of a computation system. The computation system is a network of nodes and multiple nodes are capable of being a grandmaster clock source. The method includes starting a best clock selection process, announcing clock information, and if the node is not acting grand master then receiving messages announcing clock information from other nodes of the network. Topology information is extracted from the messages, and if the node is acting grandmaster then retiring from the position of (Continued)

grandmaster. The best clock selection process steps are repeated until no node of the network becomes acting grandmaster.

15 Claims, 13 Drawing Sheets

(56) References Cited

U.S. PATENT DOCUMENTS

| | | | |
|---|---|---|---|
| 9,577,817 | B2 | 2/2017 | Yun et al. |
| 9,876,683 | B2 | 1/2018 | Kirrmann |
| 9,935,821 | B2 | 4/2018 | Huh et al. |
| 10,162,790 | B2 | 12/2018 | Wei |
| 2009/0300595 | A1* | 12/2009 | Moran .................. G06F 8/65 717/170 |
| 2013/0003757 | A1* | 1/2013 | Boatright ............ H04N 21/242 370/474 |
| 2015/0113174 | A1 | 4/2015 | Yang et al. |
| 2015/0156072 | A1* | 6/2015 | Kirrmann .............. H04L 7/00 370/254 |
| 2016/0149692 | A1 | 5/2016 | Kim et al. |
| 2017/0012826 | A1 | 1/2017 | Kumbhari et al. |
| 2017/0317814 | A1* | 11/2017 | Grice .................. G06F 1/12 |

FOREIGN PATENT DOCUMENTS

| | | |
|---|---|---|
| CN | 101848193 A | 9/2010 |
| CN | 102308521 A | 1/2012 |
| CN | 103023595 A | 4/2013 |
| CN | 104750167 A | 7/2015 |
| DE | 10260640 A1 | 7/2004 |
| DE | 102010063437 A1 | 6/2012 |
| EP | 2677690 A1 | 12/2013 |
| EP | 3016306 A1 | 5/2016 |
| EP | 3261275 A1 | 12/2017 |
| WO | 2013163803 A1 | 11/2013 |
| WO | 2017130034 A1 | 8/2017 |

OTHER PUBLICATIONS

IEEE Standard 15888-2008: IEEE Standard for a Precision clock Synchronization Protocol for Networked Measurement and Control Systems, IEEE Std 1588™-2008, Jul. 24, 2008, (Jul. 24, 2008) URL: https://ieeexplore.ieee.org/stamp/stamp.jsp?tp=&arnumber=4579760 [retrieved on May 16, 2019].

Wikipedia: "Precision Time Protocol", May 20, 2018, pp. 1-5, Wikipedia, URL: https://en.wikipedia.org/w/index.php?title=Precision_Time_Protocol&oldid=842151584.

Sunghwan Kang et al, "Timing and Synchronization with Propagation Delay Symmetry and Originated Slave Clock Frequency for Ubiquitous Computing", Complex, Intelligent and Software Intensive Systems (CISIS), 2010 International Conference on, IEEE, Piscataway, NJ, USA, Feb. 15, 2010 (Feb. 15, 2010), pp. 764-769, XP031657760, ISBN: 9781424459179.

Kevin B Stanton et al, "Tutorial: The Time-Synchronization Standard from the AVB/TSN suite IEEE Std 802.1AS(TM)-2011 (and following); as-kbstanton-8021AS-tutorial-0714", IEEE Draft; as-KBStanton-8021AS-Tutorial-0714-V01, IEEE-SA, Piscataway, NJ USA, vol. 802, No. v01, Jul. 29, 2014 (Jul. 29, 2014), p. 1-45, XP068096296.

Jeon Younghwan et al, "An efficient method of reselecting Grand Master in IEEE 802.1AS", The 20th Asia-Pacific Conference on Communication (APCC2014), IEEE, Oct. 1, 2014 (Oct. 1, 2014), p. 303-308, XP032765584, DOI: 10.1109/APCC.2014.7091652 [retrieved on Apr. 21, 2015].

Eric Spada et al, "Time Sync—Redundant Grandmaster Clock Support.; ASbt-Spada-Kim-Fault-tolerant-grand-master-proposal-051", IEEE Draft; ASBT-Spada-Kim-Fault-Tolerant-Grand-Master-Proposal-0513-V1, IEEE-SA, Piscataway, NJ USA,vol. 802.1, No. v1, May 14, 2013 (May 14, 2013), p. 1-10, XP068051769 [retrieved on May 14, 2013].

Diarra Aboubacar et al, "Improved clock synchronization start-up time for Ethernet AVB-based in-vehicle networks", 2015 IEEE 20th Conference on Emerging Technologies & Factory Automation (ETFA), IEEE, Sep. 8, 2015 (Sep. 8, 2015), p. 1-8, XP032797336, DOI: 10.1109/ETFA.2015.7301412 [retrieved on Oct. 19, 2015].

IEEE, "Timing and Synchronization for Time-Sensitive Applications in Bridged Local Area Networks—IEEE 802.1AS(TM)-2011", Piscataway, NJ, USA, ISBN: 9780738165363, Mar. 30, 2011 (Mar. 30, 2011), p. 1-292, Retrieved from the Internet: URL:http://standards.ieee.org/getieee802/download/802.1AS-2011.pdf, XP055209697, ISBN: 9780738165363, [retrieved on Aug. 26, 2015]—Uploaded Part 1 and Part 2.

Sardari, A. et al., "Development of Cross Domain Control Unit Functions", Robert Bosch GmbH, Apply & Innovate, 2016, pp. 1-14, Sep. 20-21, 2016, Karlsruhe, URL: https://ipg-automotive.com/fileadmin/user_upload/content/Download/Media/Presentation/Apply_Innovate_2016_Bosch_Sardari.pdf.

Jesse, B., "Global Time Synchronization in an Automotive Ethernet Network—Everything Done?", Vector, Oct. 15, 2015, pp. 1-22, URL: https://docplayer.net/32472142-Global-time-synchronization-in-an-automotive-ethernet-network-everything-done-v.html.

IEEE "802.1: 802.1AS—Timing and Syncrhonization", 2017, Institute of Electrical and Electronics Engineers, Inc., URL: https://www.ieee802.org/1/pages/802.1as.html.

Pyka, S., "Future of Mobility", Bosch, 2016, URL: https://www.a3ps.at/sites/default/files/conferences/2014/papers/5_bosch_pyka.pdf.

Jesse, B., "Zeitsynchronisation in Automotive-Ethernet-Netzen", Vernetzung im Automobil Sep. 8, 2016, URL: https://assets.vector.com/cms/content/know-how/_technical-articles/Ethernet_Timesync_Automobil-Elektronik_201608_PressArticle_DE.pdf.

IEEE 802.1 AV Bridging Task Gropup: "Audio Video Bridging Task Group", 2017, Institute of Electrical and Electronics Engineers, Inc., URL: https://www.ieee802.org/1/pages/avbridges.html.

Bosch: "E/E-Architecture in a Connected World", Automotive Electronics, CGD-SMT/PJ-AR, Mar. 8, 2017.

Ziehensack, M., "Automotive Ethernet ECU Communication Architecture for Autonomous Driving", Elektrobit, Jun. 5, 2015, URL: https://d23rjziej2pu9i.cloudfront.net/wp-content/uploads/2015/06/22092907/ECU_Communication_Architecture_for_Autonomous_Driving.pdf.

* cited by examiner

TOPOLOGY DISCOVERY IN AN AUTOMOTIVE ETHERNET NETWORK

The instant disclosure relates to Ethernet-based communication networks, especially as used in the automotive environment. It may be desirable that Electronic Control Units (ECU) in an automobile be able to "discover" the network topology of the network to which they are attached. It may be desirable that an ECU can autonomously identify nearest neighbors and also those connected ECU's which are one or more "hops" or steps removed.

BACKGROUND

Automotive vehicle manufacturers (OEM's) and Tier-1 suppliers to the automotive industry are preparing the next generation of architecture for automotive controllers or electronic control units, ECU's. One development is the so-called "Zone-Oriented Architecture", in which ECU's are grouped into zones, such as a front-right-door zone. A difference from previous architectures is that controllers are located at certain physical or spatial positions in order to best gather data from sensors positioned there. For example, an ECU which collects data from a sensor in the right front door may be positioned in the right front door zone.

Also under consideration is the localization or distribution of software execution for features and applications, to other controllers and processors. Such localization or distribution may be part of an optimization, and may also be used in the event of an error or a failure, e.g. of an ECU. This localization or distribution is referred to as dynamic migration, or just migration. Series production for the dynamic migration of software on other ECUs/processors (within the car) is expected soon.

Ethernet may be the network of choice for connecting ECU's in a network. Ethernet technology is becoming ever more popular for the electrical systems of vehicles and supplier products. Use of Ethernet technology requires an effective synchronization concept.

Existing Ethernet systems may use an implementation of the time synchronization standard IEEE 802.1AS. Two variants which have attracted particular attention are 802.1AS-rev failure and 802.1AS-rev time domain (the latter is a mandatory requirement for the former). Further protocols beyond the physical transfer standards include Ethernet AVB and its successor Ethernet TSN. Ethernet AVB has already been introduced for automobiles in series production. An essential substandard for Ethernet TSN and AVB is the time synchronization standard IEEE802.1AS which is dependent on the main standard IEEE 802.1 for Higher Layer LAN Protocols (Bridging). Both standards use the Precision time Protocol (PTP) of IEEE 1588 to establish a common timebase in an Ethernet network, "https://en.wikipedia.org/wiki/Precision_Time_Protocol".

PTP defines a master/slave hierarchy of clocks, along with a best timing clock within an AVB or TSN network. The best clock, or "grandmaster", serves as the source or timebase for nodes in the particular network. Each ECU or µController can potentially be grandmaster if it has the necessary configuration. The Best Master Clock Algorithm (BMCA) can be used to identify the best time clock and propagate this information in the network. Cyclical announce messages send information about the best clock of a network such as an AVB cloud to neighbor nodes of IEEE 802.1AS-capable systems. The receiver of such a message compares this information to information it may already have about the characteristics of its clock, or information it may have received from another port. On the basis of these elements of information, a time synchronization spanning tree may be set up.

Announcements continue to be cyclically dispatched even after the list of nodes of the spanning tree has been established. This allows, on the one hand, the loss of a grandmaster to be compensated by the dynamic election of a new best clock. Likewise, new nodes added during runtime or during operation can also be taken into consideration.

A 802.1AS network configures and segments itself autonomously. Due to the cyclical implementation of the BMCA Best master Clock Algorithm, participant nodes may also be connected or removed during runtime, i.e. dynamically.

The clock topology may be an important consideration for the operation of a system. The path which the data takes from sender to receiver may differ and thus pose differing demands on the quality of the data and processing. For example, if sensor data (e.g. a camera) is only one step removed—i.e. has only one hop—to the recipient, then as compared to a multi-hop topology there will be: lower latency, meaning more time for the generation of data or data processing; fewer security problems, because there are fewer points of attack on the shorter path; and more efficient data transfer, because less intermediate storage such as buffers or network resources must be made available en route along the path, which also cuts costs. With knowledge of the architecture, an application can be optimized regarding communication channels, as well as regarding redundancy for reliability. Other advantages include: higher synchronization accuracy, leading to more quality in the sensor fusion; and better possibilities for failsafe communications, since with the help of topology information redundant paths can be identified and redundancy mechanisms such as IEEE 802.1CB can be used.

It is also desirable to allow platform-independent software assignment. Depending on the Use Case, it should be possible for software developers and architects to tailor the software or applications precisely to the requirements of the application. Software optimization may best take place at the end manufacturer or Original Equipment Manufacturer (OEM). Thus the software may become more platform and customer independent.

Likewise, for security reasons it may be desirable to identify all the nodes in the network and their local addresses. Thanks to the procedures disclosed below, each node has the possibility to discover all transceivers or nodes in the vehicle. Thus foreign or unwanted data sources or ECUs can be identified.

A further consideration may be the transfer of functions or applications from one control unit to another. In future architectures a specific application may no longer be bound to a specific controller but rather be portable or transferrable to one or more different controllers. The right decision on transferring an application to a different controller can only be taken when topology information is known. Applications requiring low latency and high communication bandwidth should be executed if possible on neighboring controllers (minimizing the number of hops). Neighboring controllers can be identified using topology information to allow or improve software application localization and distribution.

Currently, information about the topology of a controller network of a vehicle, i.e. the connectivity structure of the controller network and the information on data to be exchanged, is typically provided manually or statically at a single point in time, during or after configuration of the vehicle. This topology information is not determined by dynamic software or individual applications, but rather is taken as a given, i.e. from the manufacturer. However, the growing complexity and diversity of variants in automotive production makes a static approach to topology information for each production car less efficient and less desirable.

Patent application DE 10260640 A1 describes topology discovery in a network. This is disclosed for a particular ring architecture, which is not relevant to the instant invention. Special packets are used on which basis routes for packets can be recognized and planned. However, the application describes neither interdependence of the individual nodes nor does it build on a known standard implementation.

Patent application DE 102010063437 A1 discloses a topology discovery based on LLDP news. Nodes use a special protocol and exchange topology information with one another. However this type of protocol is not used in the automotive environment, and is therefore not applicable.

Patent application EP 2677690 A1 also addresses determining the network topology of a communications network. However the instant invention differs both in the protocol used and in the efficiency of the implementation.

BRIEF SUMMARY OF THE INVENTION

The instant invention offers the benefit of determining or "discovering" the basic network structure, the topology of sender and recipient addresses and the paths between them, at any one of the time of delivery, end-of-line production, or dynamically such as after a software update such as an over-the-air (OTA) update. In fact, the instant invention may be applied at any time where a new application or Use Case is available. As described below, the inventive approach supports detecting e.g. an Ethernet network topology dynamically, including identifying all relevant nodes in the network.

In one embodiment the instant invention makes use of time synchronization protocols to determine topology information. One embodiment changes the best clock (grandmaster) of a network dynamically, and uses the best clock for a decentralized exchange of the topology information, in particular information such as addresses, ports, and distance or "hops". Time synchronization messages are exchanged with information for determining the topology of the network. In particular, the distance to the best clock and its address may be determined. By becoming the active best clock, any ECU or Controller may receive information about all the other participants of a network.

BRIEF DESCRIPTION OF THE FIGURES

The invention is best understood with reference to the figures, as described below.

DETAILED DESCRIPTION OF THE INVENTION

The detailed description set forth herein is meant to give the person of skill an understanding of certain implementations of the instant invention.

Figure 1:
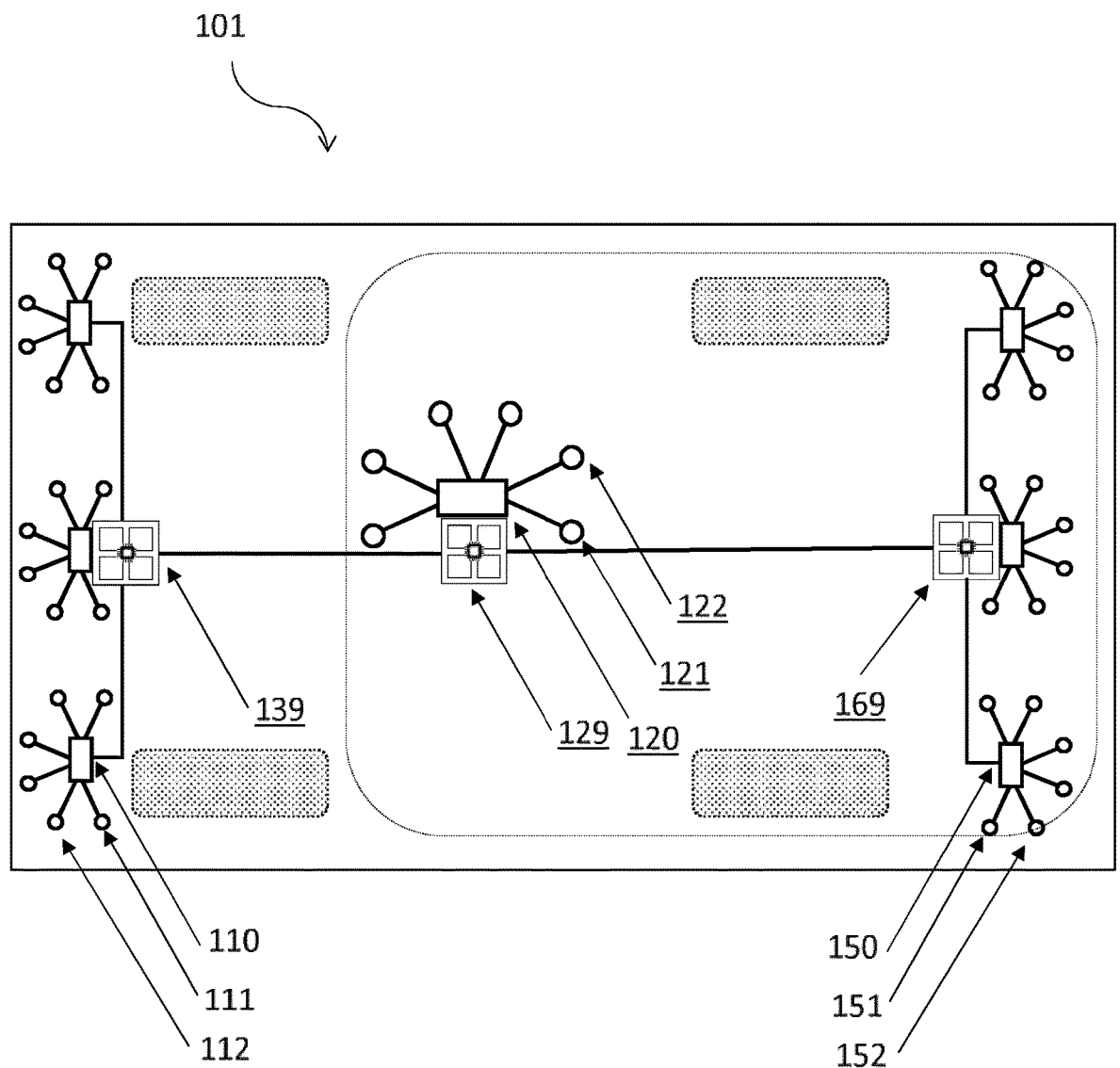
FIG. 1 shows a so-called "Zone-Oriented Architecture".

FIG. 1 shows an example of an automotive network 101. The network shows a zone-oriented architecture and includes nodes (111,112, 121, 122, 151, 152), zone controllers (110, 120, 150) and server nodes (129, 139, 169). Zones include, for example, a front-left zone with controller 110 and nodes 111 and 112, or a rear-left zone with controller 150 and nodes 151 and 152. Server nodes with processing power include 129, 139 and 169. All nodes and controllers are interconnected with one or more data transfer busses, such as an automotive Ethernet, MOST, CAN in its multiple variants, etc.

It may be advantageous to transfer processing activities from sensors towards more central zone controller and server nodes. Server nodes may have ample processing power to handle more complex analyses, sensor data fusion, etc. Moving processing activities and software applications towards central resources may be particularly advantageous when the processing load is punctual or of varying intensity. Centralizing the processing may allow an averaging of the processing load, such that an application which requires particularly much processing at one time may share resources with a different application which requires particularly much processing at a different time.

In order to allow information or data from sensors to be processed at a different location, or to allow processing at a location which may change, it may be important to analyze the topology of the entire system. It may be important to identify delays in transferring data, and it may be important to understand the quality of the clock or clocks at the node which will be doing the processing. It may be important to understand the clock latency between the source node and the receiving or processing node, or the clock variance between the source node and the receiving or processing node.

It may be an important part of the processing to provide or embed timing information in the result of processing at a node. It may be important to know what timing difference there is or there may be between two or more source nodes and a receiving node, as for example might be necessary with data fusion.

Figure 2:
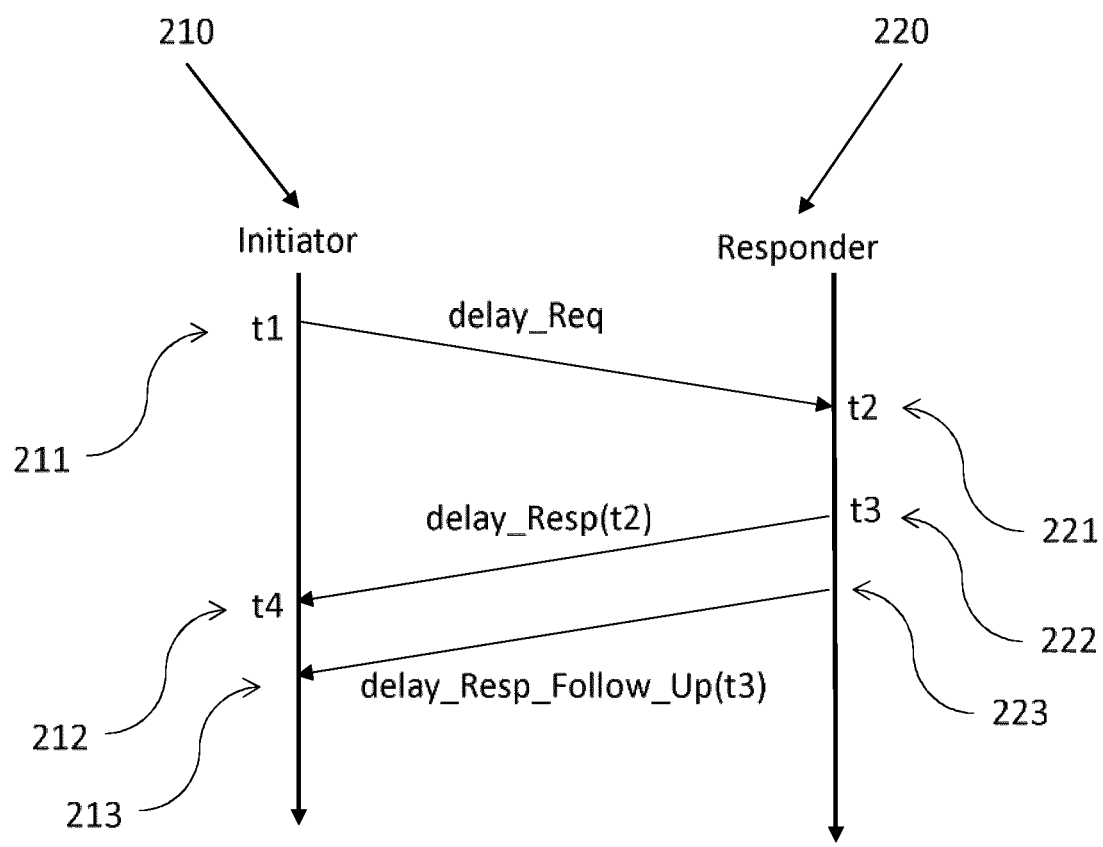
FIG. 2 shows measurement of the link delay

FIG. 2 shows a protocol as might be used for measuring the link delay in a system which uses PTP (Precision Timing Protocol) as per IEEE 802.1AS. An initiator 210 may send a delay_Req message at time t1 shown as 211. The responder 220 may receive the delay_Req message at time t2 shown as 221. The responder may send a delay_Resp(t2) message shown as 222. The Initiator may receive the delay_Resp(t2) message at time t4 shown as 212. With this message the Initiator 210 can determine an absolute time delta from sending at t1 to receiving at t4, and also a relative time t2 when the Responder received the delay_Req message. The responder may send a delay_Resp_Follow_Up(t3) shown as 223, which is received at 213. With this message the Initiator 210 can determine an absolute time delta from the Responder 220 sending delay_Resp(t2) to the Responder sending delay Resp_Follow_Up(t3). The Initiator may compare its receive time for the two messages at 212 and 213. With this the Initiator will have information about the clock synchronization quality, such as link delay and Neighbor Rate Ratio (NRR), and the transmission delay between the Initiator 210 and the Responder 220.

Figure 3:
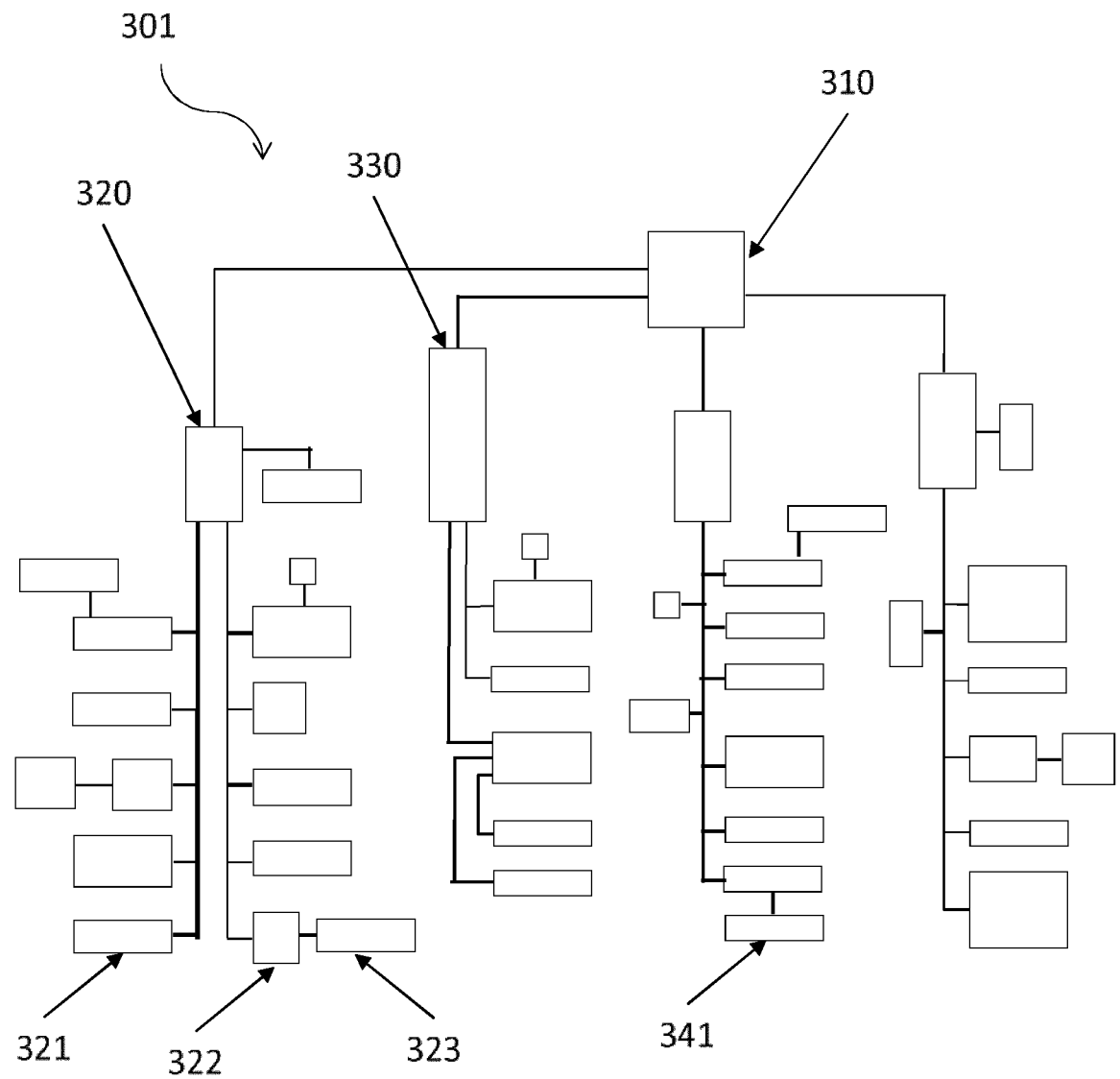
FIG. 3 shows one example of a complex automotive network as might be used for an embodiment of this invention.

FIG. 3 shows a network 301 with a topology as might be found in an automotive environment. A central node or Gateway is shown as 310. This node may typically be the clock source or best clock, in addition to being a central node in the network topology. Other nodes may be end or leaf nodes, such as nodes 321, 323, 341. Certain nodes which are intermediate points in the network are shown as 320, 330. These may be connected between the Gateway 310 and end or leaf nodes such as nodes 321, 323, 341. Node 322 is also at an intermediate point between node 320 and node 323.

Figure 4A:
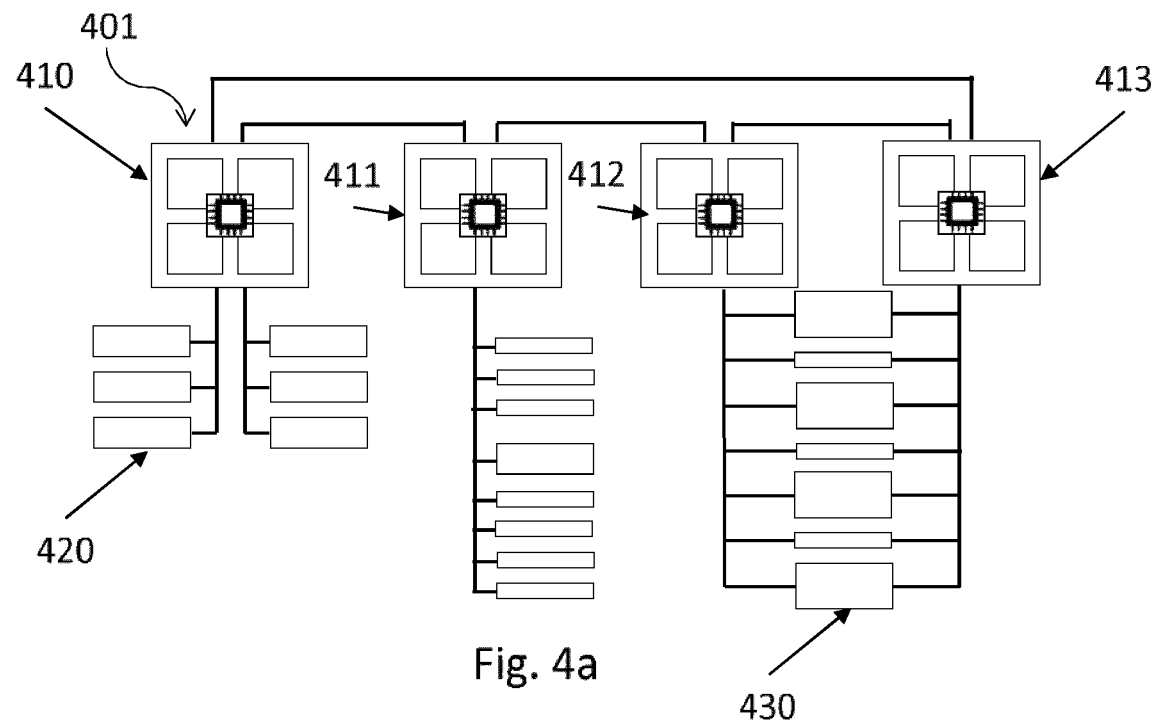
FIGS. 4a and 4b show two further examples of complex automotive networks as might be used for embodiments of this invention.

FIG. 4a shows another network 401 with a topology as might be found in an automotive environment, for example for use in a zone-oriented architecture. Multiple server nodes 410, 411, 412, 413 are interconnected in a ring topology. End nodes such as node 420 may be associated with a sensor, and are connected to a server node. End node 430 is connected via two different connections to server nodes 412 and 413.

Multiple connections and even ring connections make topology recognition or discovery more difficult. There may be two or more paths between any two given nodes, over which the nodes are a different number of steps removed (different hop count).

Figure 4B:
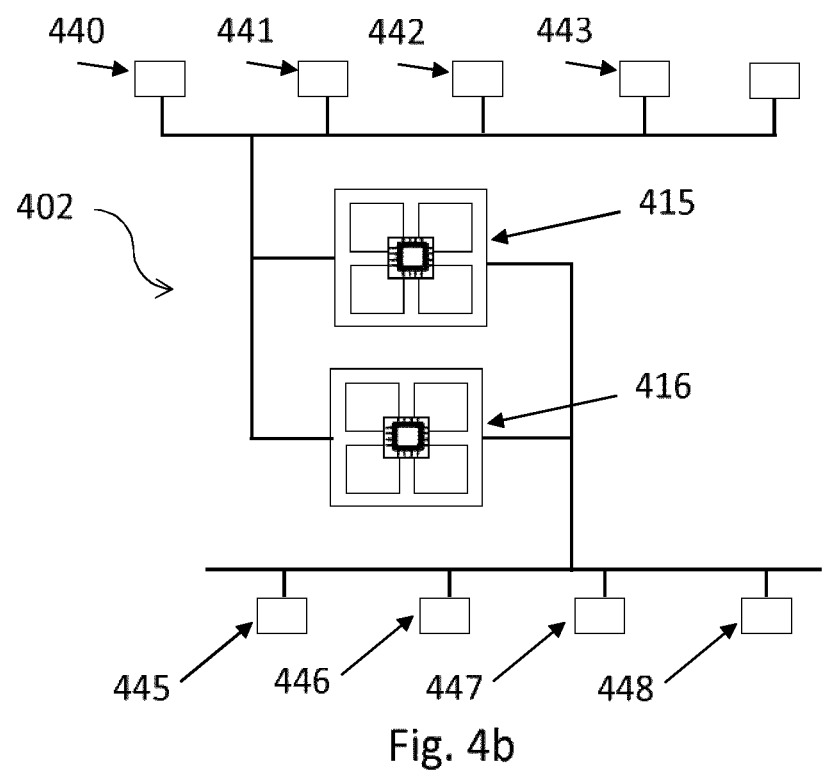

FIG. 4b shows yet another network 402 with a topology as might be found in an automotive environment, for example for use in a zone-oriented architecture. Two server nodes 415, 416 are interconnected in a ring topology, which connections also connect to two groups of end or leaf nodes, such as nodes 440, 441, 442, 443 or nodes 445, 446, 447, 448. In case of a failure of a connection, it may be possible to reach, e.g. node 440 from server node 416 only through server node 415.

The topology of a network may also change in order to reduce power. Nodes 445 and 446 may power down to save power, and it may be desirable to consider the nodes as not part of the network topology while they are powered down. Thus the complete network of FIG. 4b will be considered a partial network while the specific power-saving configuration is active. It may then be desirable or necessary for one or both server nodes to recognize or discover the new topology.

FIGS. 3 and 4 show the challenges automotive manufacturers and suppliers are faced with today. The figures illustrate the multitude of various harness topologies variants which might be used for a specific vehicle model. If the clock configuration is static, then the Gateway may always be used as clock source, even if a different node would be a best clock. For example, if clock communication between nodes 310 and 320 is the most critical for a given Use Case, then it may be advantageous for nodes 320 to become grandmaster or clock source, instead of Gateway 310.

Figure 5:
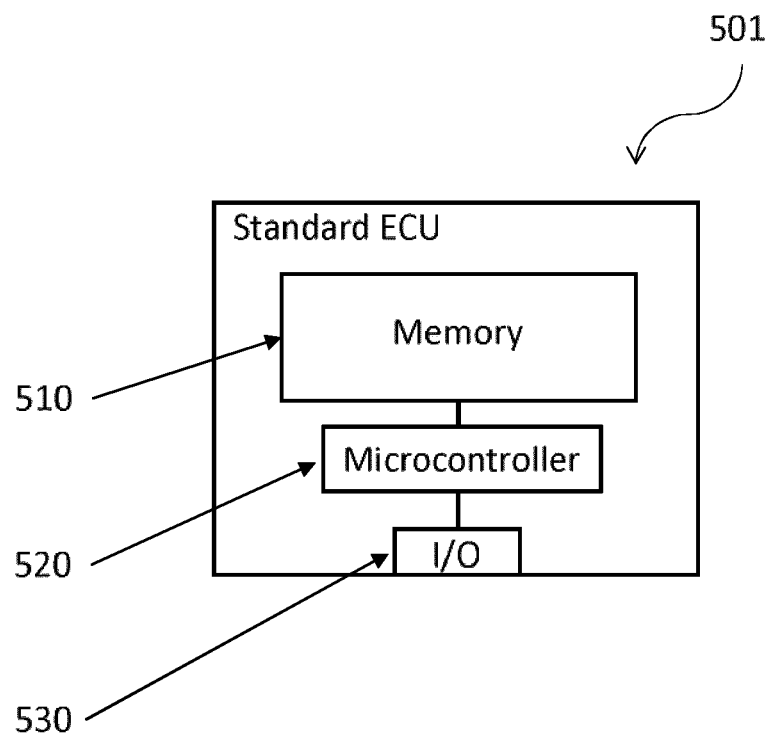
FIG. 5 shows a typical structure of an ECU as might be used as a node in an automotive network.

FIG. 5 shows a representative configuration for a simple node or ECU 501. The node includes a microcontroller 520, memory 510, and a communications interface shown as I/O 530 for communicating with other nodes in a network. Other embodiments of a node may have two or more interfaces 530. The interface may be an Ethernet interface, or a CAN bus, or a FlexRay or a wireless interface. The I/O interface 530 may correspond to one or more logical ports, which in turn correspond to a path to a next node in the network. The nodes which can be reached directly via a port correspond to those nodes which are one hop away or one step removed.

A node with multiple interfaces may use the same interface technology for each interface, or different interfaces may use different technology. For example, a node which operates as a gateway in a network may have one Ethernet interface, two CAN bus interfaces, and a LIN bus interface.

The ECU node 501 may include a precision clock generation capability which would allow it to provide synchronization information to other nodes in a network. It may have the ability to use the time reference from a GPS system, or have a high-precision clock oscillator or crystal clock. It may also include the capability to do clock correction for example due to the effects of temperature, ageing, etc. The node may have the capability to do timestamping of packets of information it sends, such that data sent includes information on the time at which the packet was prepared or was sent. Depending on the configuration of ECU 501, it may or may not be capable of being a clock source or grandmaster.

Figure 6A:
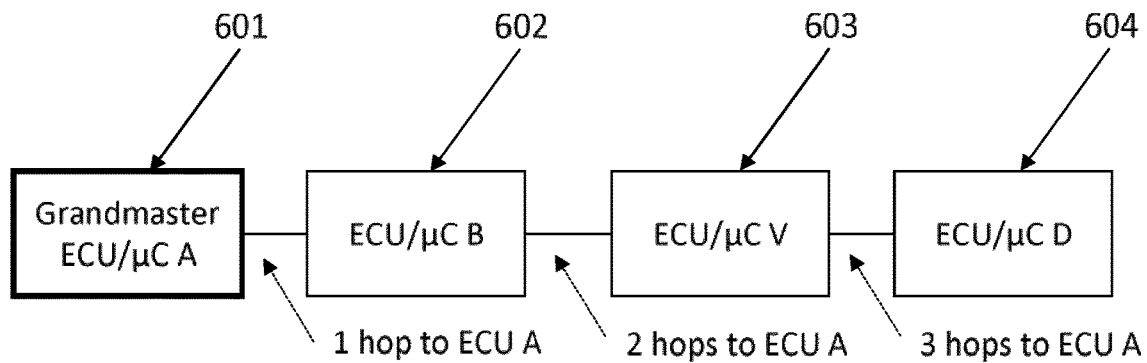
FIGS. 6a and 6b show two examples of networks with a grandmaster clock source and clock slave nodes.

FIG. 6a shows a network with a topology as might be found in an automotive environment. Node 601 is the ECU which provides the clock signal to the other nodes; it is the selected or defined best clock and will be referred to as grandmaster. Node 602 has a clock source which is one step removed, as there is one hop from the grandmaster to ECU B. Node 603 has a clock source which is two steps removed, as there are two hops from the grandmaster to ECU V. Node 604 has a clock source which is three steps removed, as there are three hops from the grandmaster to ECU D. The more steps removed, the greater may be the degradation of the quality of the clock synchronization. The clock signal may have increased latency due to the hops, or the signal may have decreased accuracy due to the hops, or both. If clock synchronization and/or clock accuracy is relevant or important for an application, then the topology of the network may have an impact. It may be necessary or desirable for the correct functioning of the network that nodes recognize or discover the topology.

Figure 6B:
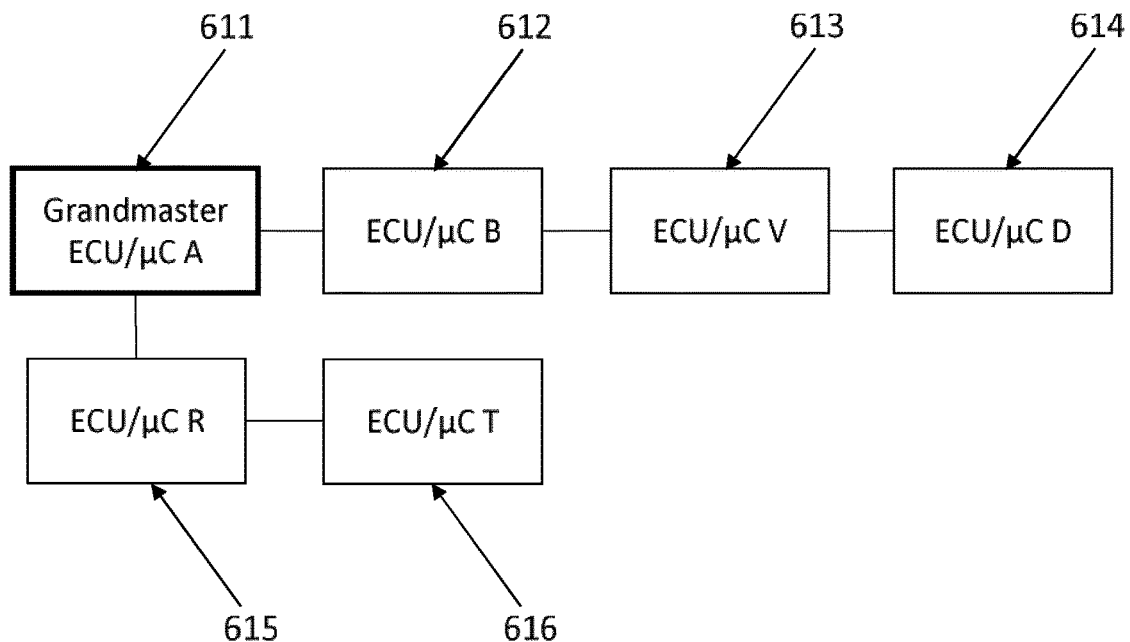

FIG. 6b shows another network with a topology as might be found in an automotive environment. Node 611 is the ECU which provides the clock signal to the other nodes; it is the selected or defined best clock referred to as grandmaster. Nodes 612 and 615 have a clock source which is one step removed, as there is one hop from the grandmaster to ECU's B and R. Nodes 613 and 616 have a clock source which is two steps removed, as there are two hops from the grandmaster to ECU's V and T. Node 614 has a clock source which is three steps removed, as there are three hops from the grandmaster to ECU D. Both the ECU's B, V, D and R, T receive a clock signal from grandmaster ECU A, but over different paths. If a different ECU were selected as grandmaster, for example from the set B, V, D R, and T, then the hops or steps removed for each node would change.

Figure 7:
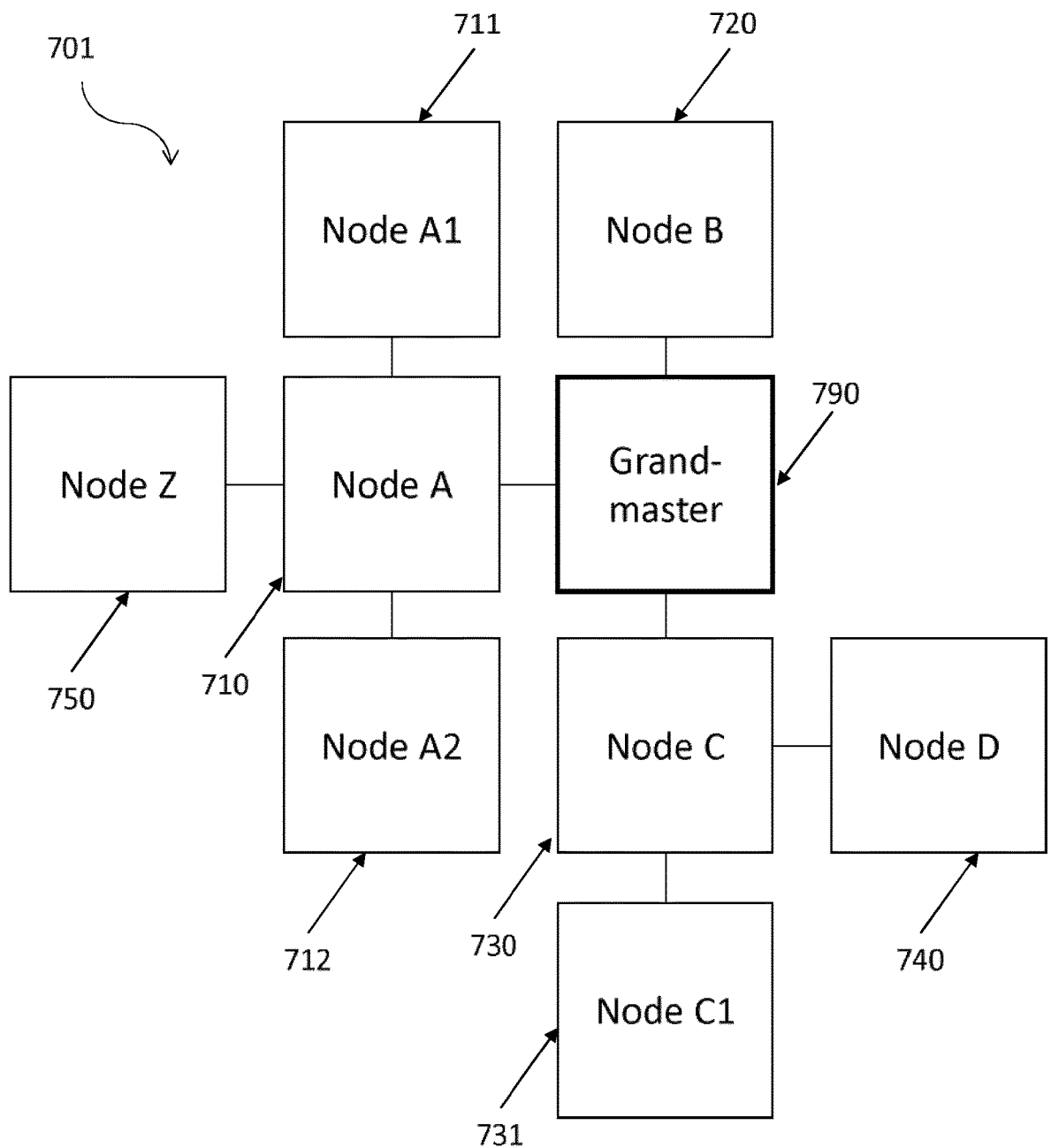
FIG. 7 shows a network with grandmaster and nodes.

FIG. 7 shows a network 701 with a clock topology. A clock source node 790 is shown as grandmaster. Certain nodes such as Node A 710, node B 720 and Node C 730 are one step removed from the grandmaster. Other nodes are two steps removed from the grandmaster, and receive their clock through an intermediate node. For example nodes A1, A2 and Z as 711, 712, 750 receive their clock through Node A 710.

The network topology may change at some point in time. Nodes may power down for power savings. A software update may change the connections, or may change the synchronization requirements of a given node. A node may be added or removed from the network, because the hardware (equipment) of a vehicle is changed, or because a node has a failure or becomes defective, and is therefore removed from the network.

Depending on the accuracy which each node in the new topology requires, the best clock may or may not have changed, and a new grandmaster may or may not be needed. Thus it may be necessary or advantageous to determine a new best clock node as grandmaster following a change in the topology of the system.

Figure 8:
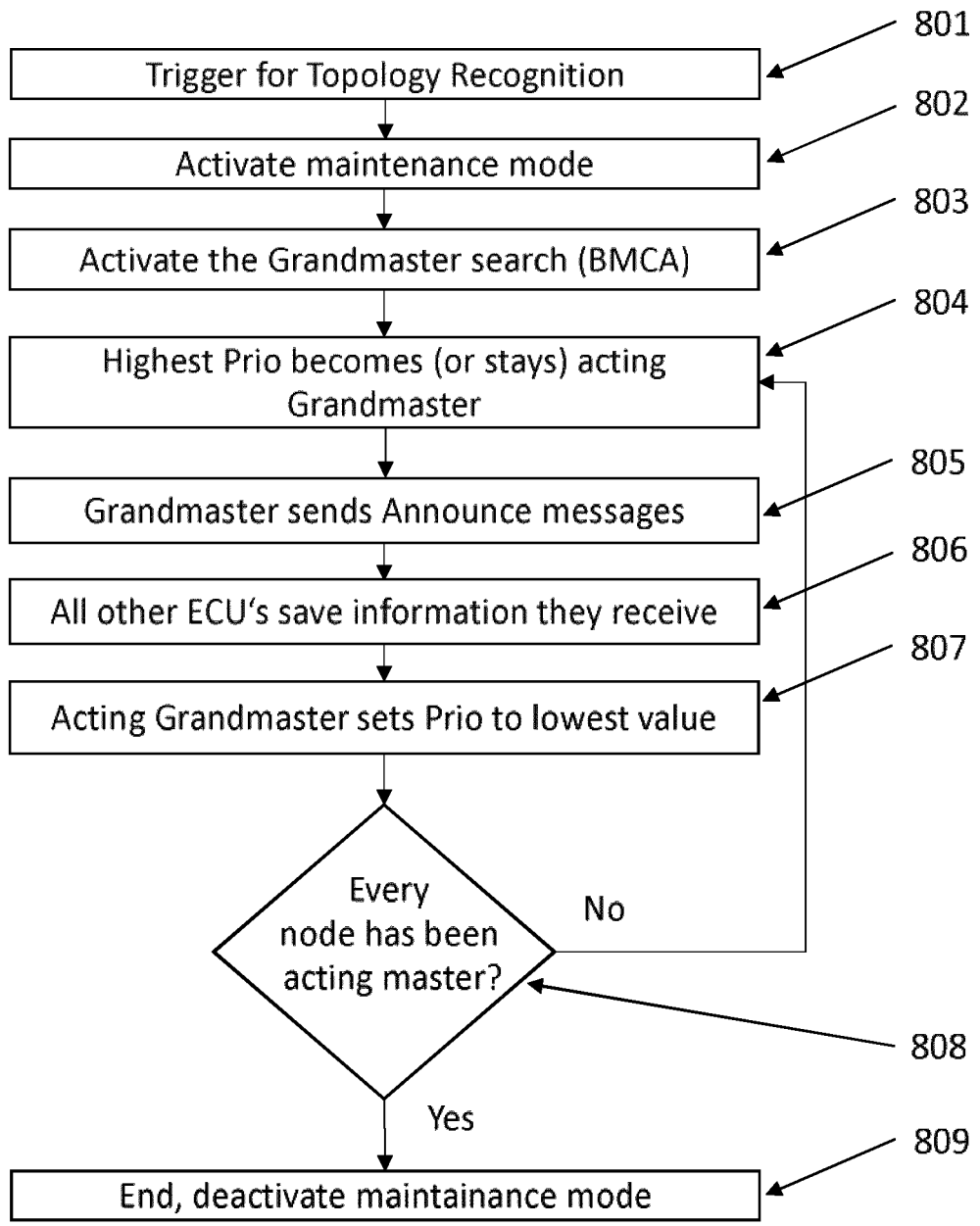
FIG. 8 shows the steps for topology recognition or discovery.

FIG. 8 shows the steps in using a synchronization information exchange protocol like the BMCA Best Master Clock Algorithm, as standardized in IEEE 802.1AS. The sequence begins with an event 801 which triggers the topology discovery or topology recognition. The launch of topology discovery can manually triggered, e.g. with a special setup menu or by an external test/diagnose unit. Another possibility is to start automatically e.g. when a new software (e.g. OTA) is loaded.

A maintenance mode may be activated 802 in order to not affect a vehicle in operation and avoid potential failures. The maintenance mode puts the car is in safe mode, e.g. at the end of the production line or in a workshop. This step may not be needed if for example the standard IEEE 802.1AS-rev operation is used, as the standard allows a parallel time synchronization of several domains. In such a case, one domain can be used for normal operation, and another domain especially for the topology discovery.

The search algorithm to find the best master clock (BCMA) is then started at 803. In one embodiment the best clock selection process uses the master clock selection algorithm of IEEE 802.1AS.

In the first step of a loop at 804, a unique node is selected. In IEEE 802.1AS, this is the node with the highest priority. The selected node will be called grandmaster. The rule which is used to select a node at the first step of the loop, must insure that each node which can become clock source or grandmaster (for example, which has the capabilities) is selected at least once. For efficiency considerations, it is better that a node which has been selected once is not selected again.

In a next step of the loop, the acting grandmaster sends announce messages 805 announcing clock information, which provide status and characterization information from the grandmaster node that transmitted the message. This information is used by the receiving nodes and end nodes when executing the best clock selection process, e.g. BMCA. The nodes of the network must extract topology information from the announce messages they receive and save the information at step 806. Examples from an embodiment with the information nodes receive will be discussed below. Information to be extracted may include the path to another node, the port which connects to that path, and the number of steps the node is removed when using the given port. When the acting grandmaster node has completed sending announce messages to other nodes, it then retires itself to no longer be selected as the acting grandmaster in step 807. It does this in the context of IEEE 802.1AS by setting its priority to the lowest possible value. In this way, each other node will have a higher priority and will become acting grandmaster, or no other node will become grandmaster and the discovery loop will complete. As indicated above, the rule which is used must insure that each node which can become clock source or grandmaster, is selected at least once.

In step 808 is evaluated whether a node with priority can become grandmaster. If every node has been acting clock source and then retired itself, for example in that it set its priority such that it no longer will become grandmaster, then the loop finishes, otherwise the loop returns to step 804 with the highest priority node becoming grandmaster.

If every node, or at least every node which may act as a clock source or grandmaster, has sent announce messages, then the sequence ends at step 809. When all selectable nodes have been selected, then the best clock selection process has completed. If no node manifests itself as a priority node to become acting grandmaster, this is an indication that the search algorithm has completed. For example, a timeout may be generated if there is no priority node, and then the search is terminated. If a maintenance mode was activated, then the maintenance mode should be deactivated here.

In one embodiment, all nodes of a network may be selectable, as each node is capable of being acting grandmaster, or because each node is potentially a best clock source for the network. In another embodiment, only some nodes may be capable of being acting grandmaster, and so only some nodes may be selectable. In another embodiment, certain nodes may not be selectable because they are to remain hidden, or for other reasons. In embodiments, a node with multiple interfaces may not do a trial as grandmaster, or may participate in a selection process with only one or a limited number of interfaces.

Figure 9:
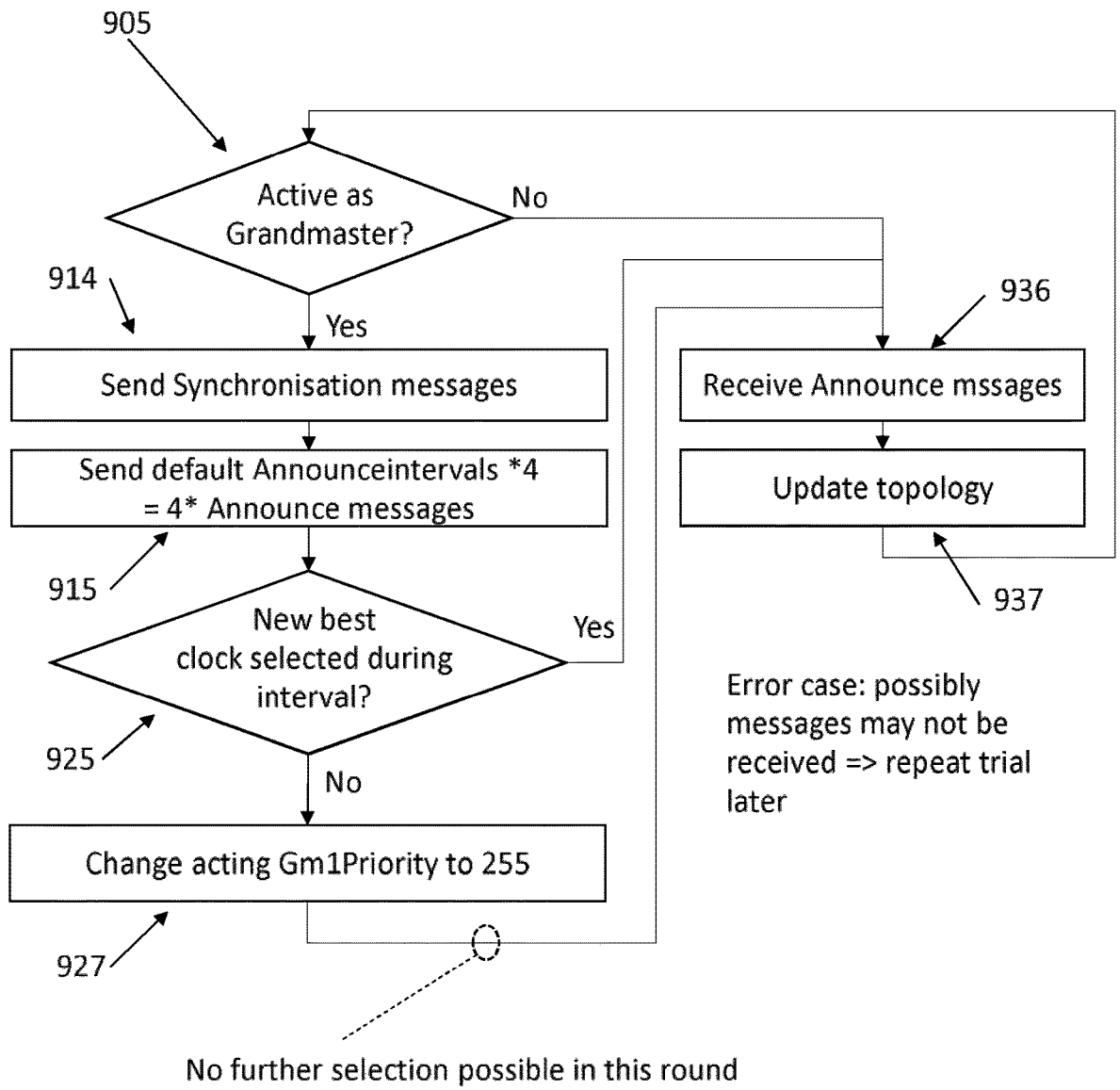
FIG. 9 shows details of a round of message exchange.

FIG. 9 shows more detail on the sending and receiving of messages in the context of IEEE 802.1AS viewed from the perspective of a node, as an example embodiment. It is presented as a loop corresponding to the loop of FIG. 8. Starting at step 905, the node checks if it is active as grandmaster. If not, the node listens for and receives announce messages at step 936. If the node is grandmaster, at step 914 it sends synchronization messages. This is an optional step in terms of the operation of the inventive concept, but is required by the standard IEEE 802.1AS. Sending sync messages may insure that nodes of a network are compatible with the inventive concept, even if the network includes legacy nodes which do not participate in the inventive concept and the topology discovery steps.

In step 915, the acting best clock or grandmaster node sends announce messages. The node may send its message more than 3 times, and it may send with a fixed number of repetitions in order for a timeout to be performed successfully. In the given embodiment the message will be sent 4 times. At a decision step 925, it may be of interest to see if a new best clock candidate node has presented itself. If another node announces itself as new best clock, then the acting grandmaster may retire with no further action and proceed to step 936, listening for announce messages. Nodes extract topology information including MAC-addresses from the announce messages they receive. Otherwise at step 927 the acting grandmaster changes its priority to a lowest priority value, such as 254 or 255, and then returns to waiting for announce messages at 936. In the context of a IEEE 802.1AS embodiment, the value 255 means that a node is not grandmaster-capable, while the value 254 means that all other nodes which do not select 254 will have a higher priority. The node then passes to step 936 to receive announce messages, and at step 937 it updates its own view of the topology. This loop continues for as long as further nodes are to be evaluated as grandmaster nodes. If no other node announces itself as acting grandmaster or new best clock, then either all nodes which wish to be considered as grandmaster have already been acting grandmaster, or there is a fault in the network. Of course, nodes may need a certain time to respond and send announce messages, depending on the topology.

The minimum number of cycles through the loop of FIG. 8 or the loop of FIG. 9 is given by the number of "known" nodes, excluding those nodes which may never be grandmaster (GM). End or leaf nodes can be identified by the number of ports; a single port means that a node is an end node or leaf node. As soon as node are connected to the network through other nodes which are not end nodes, there may be nodes which are "hidden" from other nodes because they have not yet been discovered. From the example of FIG. 7, nodes A1 and A2 at 711, 712 and Node C1 at 731 might not be visible to any nodes other than Node A and Node C respectively at system start. Likewise, if Node A2 is added later, for example through a change of Use Case with different software, or by adding a hardware node, or because the node was powered down and is then activated, the node may be hidden to all nodes except Node A 710. Any loop process and best clock search algorithm must consider the possibility of hidden nodes.

Likewise, deadlock prevention at the start of operation may require all nodes—or at least those which are grandmaster capable—to assume they are best master clock, and to send announce messages. This may mean that many nodes send announce messages simultaneously until an acting grandmaster has been selected.

Figure 10:
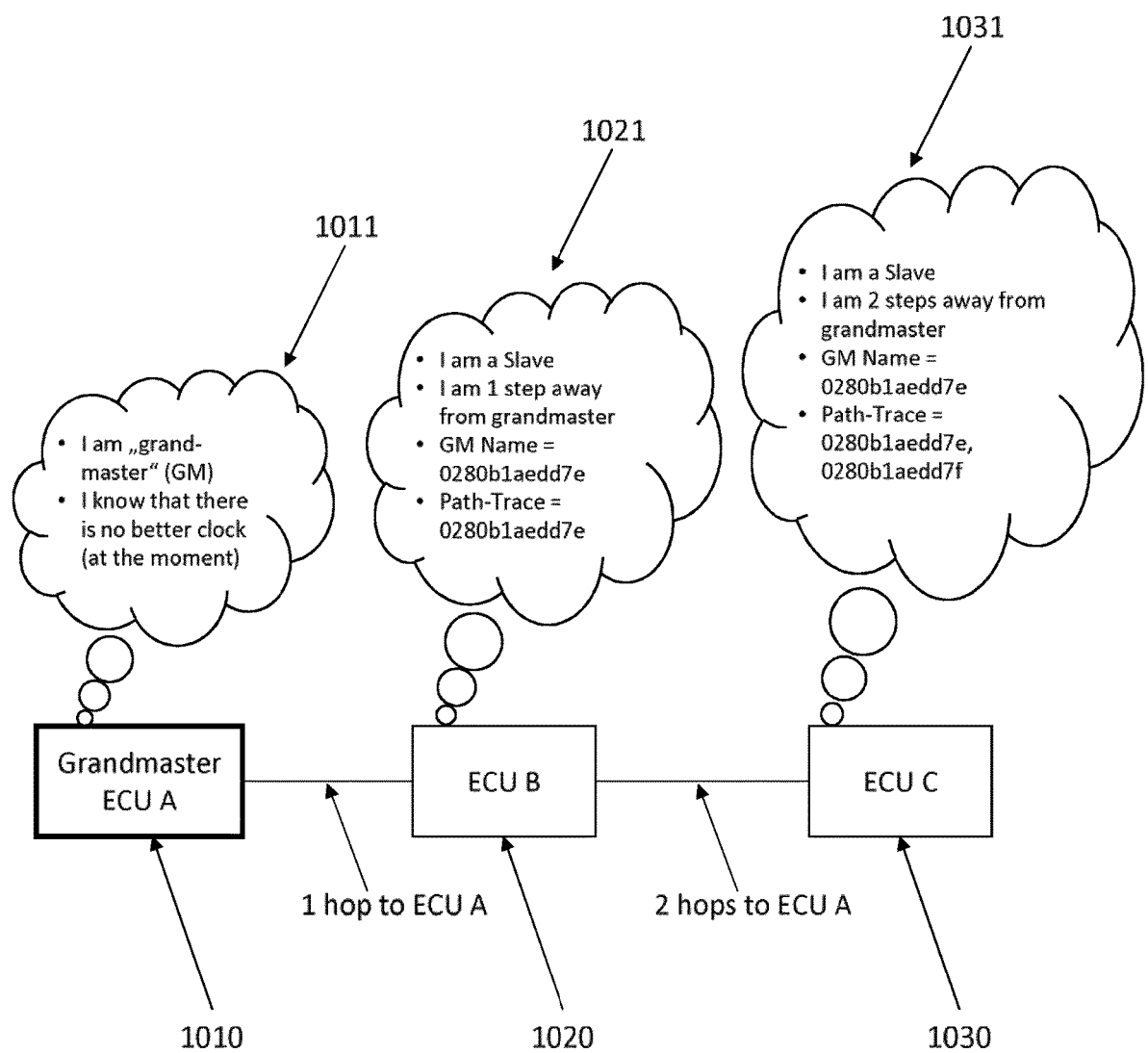
FIG. 10 shows the topology information available at 3 nodes in a network.

FIG. 10 shows the information which becomes available to nodes when listening for and receiving announce messages. A message 1011 is sent from grandmaster ECU A 1010. In an embodiment in the context of IEEE 802.1AS, the announce message provides status and characterization information from the grandmaster node that transmitted the message. This information is used by the receiving nodes and end nodes when executing the BMCA.

The announce message makes one hop to ECU B 1020, because ECU B is one step removed from ECU A. ECU B now has the path trace information shown as 1021 including the GM name, the path trace, and the number of steps to the GM. ECU B forwards the message for another hop to ECU C 1030. ECU C now has the path trace information shown as 1031 including the GM name, the path trace, and the number of steps to the GM, which is two steps removed in this example.

Each node can thus collect information about the topology of the network as seen from its own perspective. In particular, each node can evaluate the number of hops to any grandmaster if that node were to become the grandmaster or clock source during operation.

Figure 11:
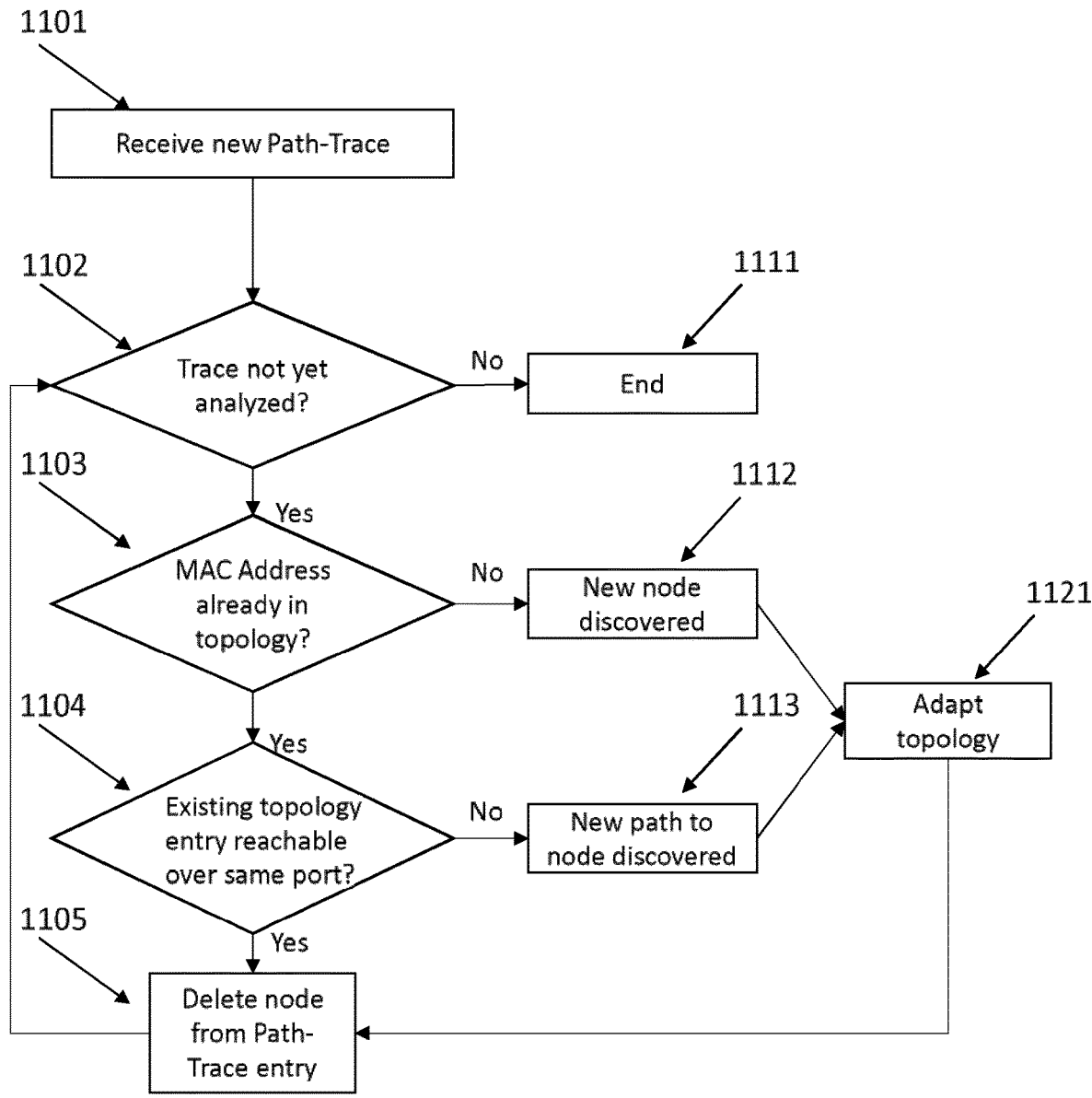
FIG. 11 shows evaluation of contents of a path trace message.

FIG. 11 gives additional detail on the evaluation which can be done with the information extracted from the path trace received as an announce message. A node which participates as a potential clock source may be a necessary participant in the evaluation of paths, while a node which cannot be clock source may instead be passive and receive whatever clock information is sent by a clock source as chosen. Topology discovery must be done by at least one node, which needs to know the path to the grandmaster or clock source. An acting GM broadcasts messages as in FIG. 8, and thus may not need to know anything of the topology. At step 1101 a node starts with a new message with a path trace, for example as shown in FIG. 10. With this the node first performs the analysis of step 1102, whether the trace has been analyzed. If so, no further analysis is necessary, and the evaluation ends at step 1111. If not, the evaluation continues at step 1103 with a comparison of known node addresses, in this example as MAC addresses. If the address is not yet known, then at step 1112 a new node has been discovered in the topology, and the evaluation continues at step 1121. If the address is known, then the evaluation at step 1104 is whether a new port has been discovered via which the node address is reachable. If the port is the same, then the node and path are already part of the topology, and the evaluation at step 1105 continues with the next node. If the port is different or new, then a new path to a known node is recognized at step 1113, and the evaluation also continues at step 1121. In step 1121 the analyzing node can adapt its view of the topology including the newly discovered node or path. Then the evaluation continues as above with step 1105.

Figure 12:
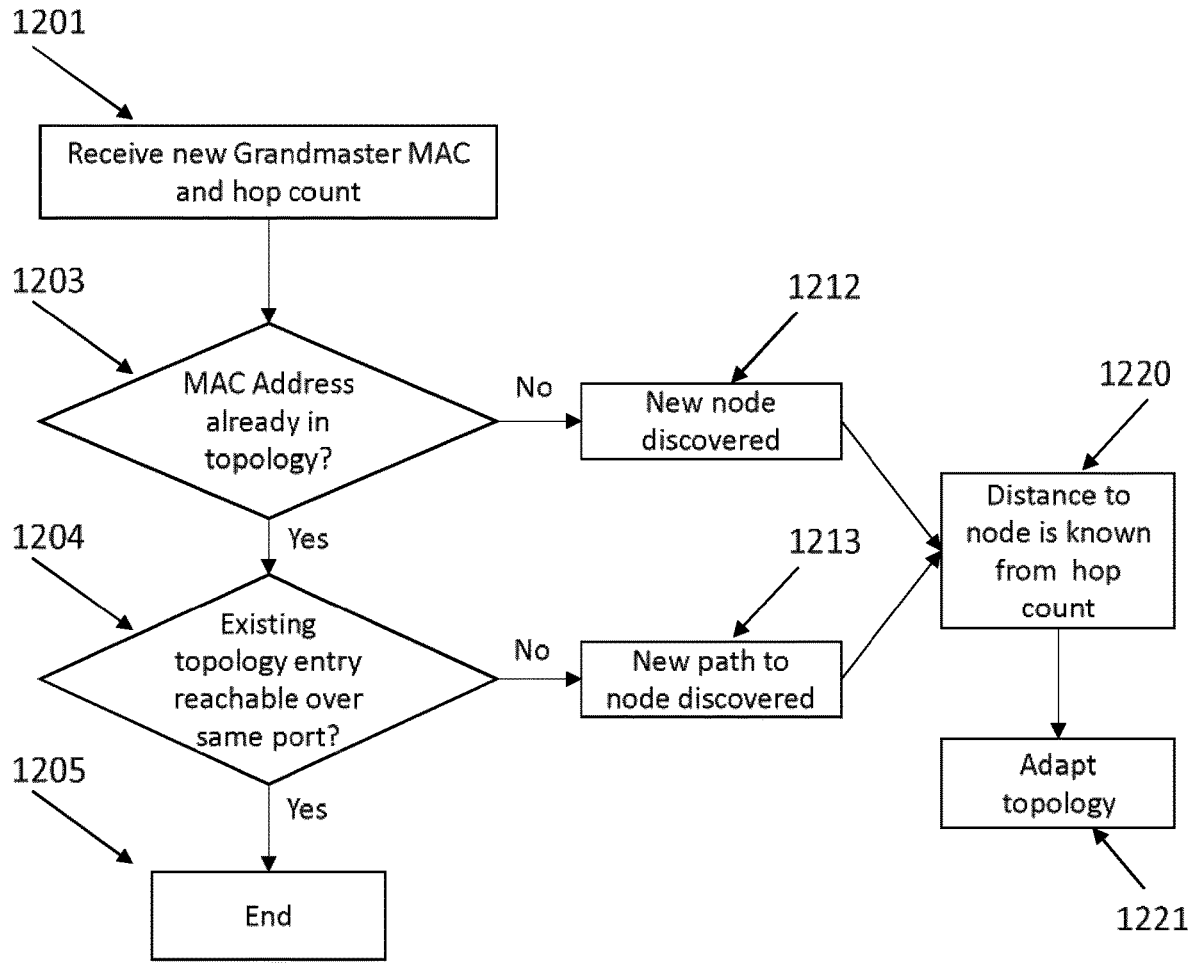
FIG. 12 shows evaluation based on best clock and hop count.

FIG. 12 shows an evaluation independent of the path trace, which may be particularly suited to identify and resolve redundant paths, as redundant paths may lead to multiple announce messages being received. In this case the node performs an evaluation based on the GM MAC address and the hop count instead of the path trace. The address and count of steps removed are received at 1201. At step 1203 the evaluation continues based on whether the address is already in the known topology. If not, the evaluation passes to step 1212 where a new node has been discovered. If the address is known, the evaluation continues based on whether the node is already known as reachable over the same port at step 1204. If yes, the evaluation ends. If not, the evaluation continues at step 1213 where a new path to a known node has been discovered. In step 1220 the distance to the node can be determined from the hop count. In step 1221 the topology is adapted accordingly.

Figure 13:
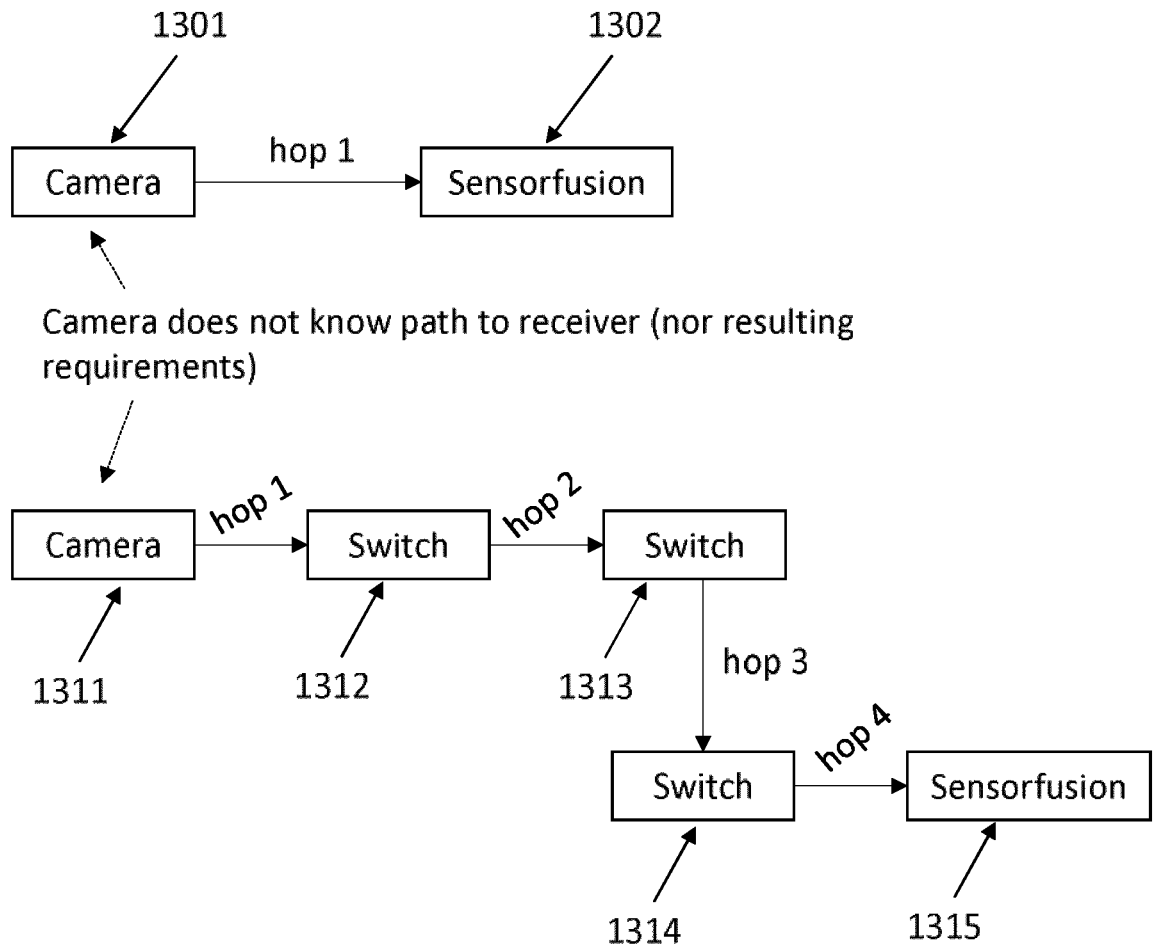
FIG. 13 shows two possible topologies of an automotive sensor fusion network.

FIG. 13 shows an application of the inventive concept in the context of sensor fusion with two configurations. A camera node 1301, 1311 sends data to a sensor fusion node 1302, 1315. In the case of nodes 1301, 1302 the nodes are one step removed, and there is 1 hop between the nodes. In the case of nodes 1311, 1315 the nodes are four steps removed, as there are 4 hops between them. With the inventive algorithm, the sensor fusion and camera nodes can identify the number of hops and act or react accordingly.

The number of steps between the nodes may be fixed at one point in time, for example at production or delivery. Or the number of steps in the topology may change. The topology may change e.g. because of a failure in a node or a fault in the topology, either transient or permanent. The topology may change for a limited time or on a recurring basis; for example, partial networking may be used to save power, shutting down parts of the network. Or the topology may change due to a software update such as an OTA update, or because hardware is added to or removed from the topology. In an embodiment in the context of an IEEE 802.1AS network, the network may configure and segment itself autonomously. Due to the cyclical implementation of the BMCA (Best master Clock Algorithm), participant nodes may also be connected or removed during runtime, i.e. dynamically.

The context of an IEEE 802.1AS network for automotive environments is given as a preferred embodiment. However, it should be clear to the person of skill that the inventive concept can be implemented in other networks and for other environments such as industrial Use Cases.

The invention claimed is:

1. A method of determining a topology of a computation system by a node, wherein the computation system is a network of nodes, and multiple nodes are capable of being a grandmaster clock source, the method comprising:
   starting a best clock selection process;
   announcing clock information;
   if the node is not acting grandmaster, then receiving messages announcing clock information from other nodes of the network; and extracting topology information from the messages;

if the node is acting grandmaster, then retiring from a position of grandmaster; and repeating the best clock selection process steps until no node of the network becomes acting grandmaster.

2. The method according to claim 1, wherein the network of nodes is a network of automotive engine control units (ECUs).

3. The method according to claim 1, wherein the step of starting the best clock selection process comprises sending a message announcing clock capabilities of the node sending the message.

4. The method according to claim 1, wherein the best clock selection process uses the best master clock algorithm (BMCA) of IEEE 802.1AS.

5. The method according to claim 3, wherein the message announcing the clock capabilities of the acting grandmaster is an announce message of IEEE 802.1AS.

6. The method according to claim 1, wherein the step of starting the best clock selection process comprises sending at least four messages announcing the clock capabilities of the acting grandmaster or sending exactly four messages announcing the clock capabilities of the acting grandmaster.

7. The method according to claim 1, wherein the step of extracting topology information from the announce messages comprises: when a message indicates a new topology, updating topology information.

8. The method according to claim 1, wherein the given node which is the acting grandmaster changes a priority of the given node to a lowest priority after being the acting grandmaster.

9. The method according to claim 1, which comprises sending from the acting grandmaster one or more synchronization messages before sending a message to announce the capabilities of the acting grandmaster.

10. A node, configured to perform the steps of the acting grandmaster of claim 1.

11. The node according to claim 10, wherein the node is an automotive ECU.

12. The node according to claim 10, comprising at least one Ethernet interface.

13. The node according to claim 10, comprising a plurality of interfaces.

14. The node according to claim 10, comprising at least one interface which is not an Ethernet interface.

15. The node according to claim 10, configured as a precision clock source.

* * * * *